Patented Mar. 24, 1936

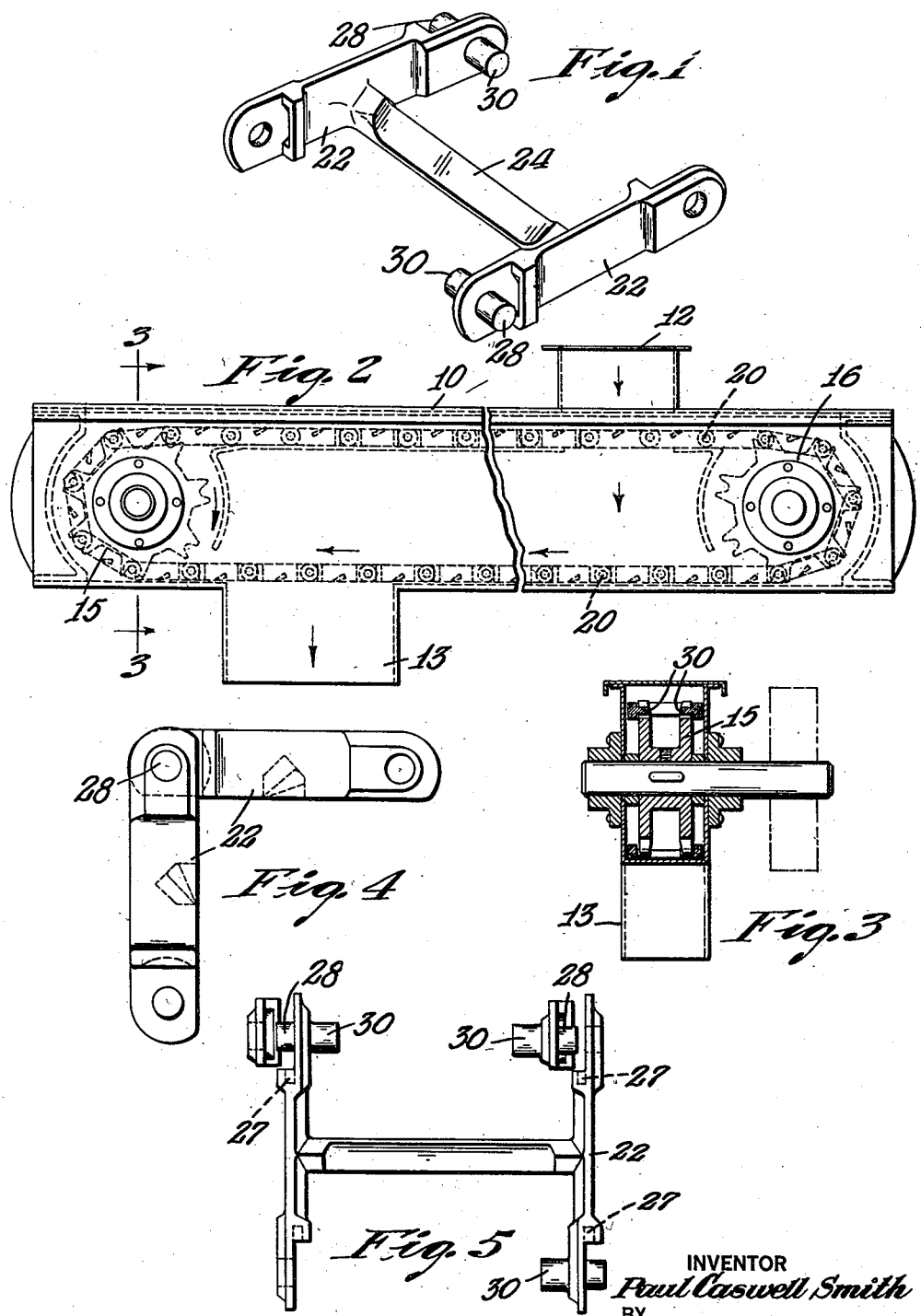

2,035,018

UNITED STATES PATENT OFFICE 2,035,018

CONVEYER

Paul Caswell Smith, Aurora, Ill., assignor, by mesne assignments, to Redler Conveyor Company, Quincy, Mass., a corporation of Massachusetts Application November 14, 1934, Serial No. 752,998

3 Claims. (Cl. 198—168)

This invention relates to a conveyer and more particularly to a conveyer for transporting flowable solid material.

The invention has for an object to provide a novel and improved conveyer capable of operation in a smooth, uninterrupted and efficient manner.

With this object in view and such others as may hereinafter appear, the invention consists in the conveyer hereinafter described and particularly defined in the claims at the end of this specification.

In the drawing illustrating the preferred embodiment of the invention, Fig. 1 is a perspective of one of the conveyer flights used in the construction of the present conveyer; Fig. 2 is a side elevation with portions omitted illustrating a conveyer embodying the invention; Fig. 3 is a sectional detail on the line 3—3 of Fig. 2; Fig. 4 is a side elevation of two connected flights on the part of the conveyer showing the pivotal action thereof; and Fig. 5 is a view of two conveyer flights in position ready to be assembled.

The present invention comprises an improvement upon the general type of conveyer illustrated in the Redler Reissue Patent No. 18,455. Such type of conveyer is adapted to effect the conveyance of flowable solid material in a continuous stream through a casing by means of a conveying element comprising a plurality of connected flights, each of skeleton or open structure and so designed as to effect the desired conveyance of the material in a continuous stream through the casing, and the open structure of the flights is such as to permit the conveyer member to be readily pulled through the material without jamming or stalling the conveyer in the event that the outlet from the conveyer casing becomes closed. The conveyer member is arranged to be drawn through the conveyer casing by a driving sprocket, and as heretofore constructed, in conveyers of the described type, the driving sprocket has been arranged to cooperate with and drive against the crossbar of the conveyer flight, which has been located centrally of the conveyer flight and spaced a substantial distance from the pivots between adjacent flights. In practice, some irregularity and jumping of the conveyer member has been experienced during the use of the conveyer.

It has been discovered that this irregularity and jumping of the conveyer member may be successfully overcome in a conveyer of the type described by so constructing the conveyer flights as to enable the driving sprocket to drive against a portion of the conveyer flight located at the point or points at which one conveyer flight is pivotally connected to a succeeding flight. With this arrangement, the operation of the conveyer is smooth, and any tendency toward jumping and irregular movement is eliminated.

Referring now more particularly to the drawing, 10 represents a conveyer casing which is provided with the usual inlet 12 and outlet 13, through which the flowable solid material is introduced into and discharged from the conveyer casing. The casing has journalled therein in suitable bearings a driving sprocket 15 and idler sprocket 16 at opposite ends thereof, and which, in practice, may be spaced relatively long distances apart. An endless conveyer member indicated generally at 20 is arranged to be drawn around the sprockets, and to be drawn through the casing to convey the material therethrough in a continuous stream, and comprises a large number of pivotally connected individual flights of open structure by which the flowable solid material is arranged to be conveyed through the casing from the inlet to the outlet.

The conveyer member 20 is made up of a plurality of open flights which are arranged to be pivotally connected one to the other to form the complete endless conveyer member. As herein shown, each flight comprises side bars 22 rigidly connected by a centrally disposed cross-bar 30 24. The opposite ends of the side bars are provided with holes for the reception of pivot pins 28 formed integrally with and projecting from the second end of the respective side bars to thereby enable the flights to be pivotally connected together. In order to lock the flights together, the side bars are provided with locking recesses 27 into which the end portions of the side bars 22 of a succeeding link extend to be restrained from lateral movement in the normal working positions of the flights, and at the same time, to permit the flights to be readily disengaged one from another when they are disposed angularly beyond such normal working positions, as illustrated in Fig. 4. In order to provide bearing members at the points where one link is pivotally connected to the other, I prefer to provide each side bar with an inwardly projecting bearing pin 30, so that when the flight passes over the driving sprocket 15, as illustrated in Figs. 2 and 3, the teeth of the sprocket engage and bear against the bearing pins 30.

In the illustrated construction, a pivot pin 28 and a bearing pin 30 are provided at opposite ends of the two side bars 22, and when succeeding flights are pivotally connected together in the manner illustrated and as above described, two bearing members are provided in alignment with the pivotal connection between the adjacent flights.

Experience has demonstrated that this construction of conveyer member enables the conveyer to be operated in a smooth and most efficient manner, and eliminates any tendency which has heretofore been experienced in the conveyer member running irregularly or jumping during the passage thereof over the driving sprocket.

While the preferred embodiment of the invention has been herein illustrated and described, it will be understood that the invention may be embodied in other forms within the scope of the following claims.

Having thus described the invention, what is claimed is:—

1. A conveyer for transporting flowable solid material in a stream comprising a conveyer casing provided with a driving sprocket, an endless conveyer member within the casing and arranged to run over the driving sprocket, said conveyer member comprising a plurality of pivotally connected flights of open structure, each flight being provided with bearing means located in alignment with the pivot for the flight and with which the driving sprocket is arranged to cooperate to exert a driving action upon the flight at the point of pivotal connection between adjacent flights.

2. A conveyer for transporting flowable solid material in a stream comprising a conveyer casing provided with a driving sprocket, an endless conveyer member within the casing and arranged to run over the driving sprocket, said conveyer member comprising a plurality of individual flights of open structure having a longitudinally extended member and a transversely extended member, said flights being pivotally connected together and provided with bearing members located at the pivot points of the flights and arranged to project inwardly from said longitudinally extended members and with which the driving sprocket is arranged to cooperate to exert a driving action upon the flights at the point of pivotal connection between the flights.

3. A conveyer for transporting flowable solid material in a stream comprising a conveyer casing provided with a driving sprocket, an endless conveyer member within the casing and arranged to run over the driving sprocket, said conveyer member comprising a plurality of individual flights of open structure having spaced side bars and a cross bar, each side bar of said flights having upon one end two aligned pins, one extending outwardly and the other inwardly and constituting pivot and bearing pins respectively, said pins being disposed upon opposite ends of the two side bars of each flight.

PAUL CASWELL SMITH.